United States Patent [19]
Kötzle et al.

[11] Patent Number: 5,313,828
[45] Date of Patent: May 24, 1994

[54] MULTI-COMPONENT MEASURING DISC WHEEL

[75] Inventors: Horst Kötzle, Albershausen; Bernd Oelmann, Stuttgart; Ulrich Schäfer, Fellbach; Gerhard Schwarz, Deizisau, all of Fed. Rep. of Germany

[73] Assignee: Mercedes-Benz AG, Fed. Rep. of Germany

[21] Appl. No.: 958,190

[22] Filed: Oct. 9, 1992

[30] Foreign Application Priority Data

Oct. 9, 1991 [DE] Fed. Rep. of Germany ....... 4133418

[51] Int. Cl.⁵ .......................................... G01M 17/02
[52] U.S. Cl. .................... 73/146; 73/862.044
[58] Field of Search ............... 73/862.042–862.045, 73/146

[56] References Cited

U.S. PATENT DOCUMENTS

| | | | |
|---|---|---|---|
| 3,867,838 | 2/1975 | Gerresheim | 73/862.042 |
| 3,948,080 | 4/1976 | Boyd | 73/146 |
| 4,023,404 | 5/1977 | Brendel | 73/146 |
| 4,297,877 | 11/1981 | Stahl | 73/146 |
| 4,577,513 | 3/1986 | Harwood et al. | 73/862.044 |
| 4,748,844 | 6/1988 | Yoshikawa et al. | 73/862.044 |

FOREIGN PATENT DOCUMENTS

| | | |
|---|---|---|
| 0352788 | 1/1990 | European Pat. Off. |
| 2104003 | 7/1973 | Fed. Rep. of Germany |
| 2302540 | 7/1974 | Fed. Rep. of Germany |
| 2828538 | 1/1980 | Fed. Rep. of Germany |
| 2856453 | 7/1980 | Fed. Rep. of Germany |
| 3213319 | 10/1982 | Fed. Rep. of Germany |
| 2708484 | 7/1983 | Fed. Rep. of Germany |
| 1331581 | 9/1973 | United Kingdom |

*Primary Examiner*—Robert Raevis
*Attorney, Agent, or Firm*—Evenson, McKeown, Edwards & Lenahan

[57] ABSTRACT

A multi-component measuring disc wheel for vehicles is provided in which an annular measuring disc is held on an auxiliary flange of the specially designed rim by means of a plurality of stud bolts parallel to the axis. The stud bolts act as measuring cross-sections and are equipped with strain gauges. The measuring disc is held at a distance from the auxiliary flange and has spoke-type measuring webs which are also equipped with strain gauges. The inner edge of the measuring disc is bolted to a pot-shaped wheel adaptor which compensates for the axial distance between the measuring disc and the normal axial position of the bolt-on flange of the wheel disc of a conventional vehicle wheel and matches in the bolt-on region the bolt-on flange of a conventional vehicle wheel disc. A signal transmission device is rotatably mounted in or on the wheel adaptor and the stationary part of the signal transmission device is fixed by means of a movable linkage which is, however, fixed in the peripheral direction. The strain gauges applied to the axial and the radial measuring cross-sections are selected in an appropriate manner as shear strain gauges or as tension/compression strain gauges and are applied in such a position in each case and with respect to their alignment and are connected into associated electrical measuring bridge circuits.

5 Claims, 5 Drawing Sheets

MULTI-COMPONENT MEASURING DISC WHEEL

BACKGROUND AND SUMMARY OF THE INVENTION

The invention relates to a multi-component measuring disc wheel for vehicles. Such a measuring disc wheel is known, for example, from a public lecture on the subject "Multi-component measuring technology" given by U. Schafer on 21 Feb. 1990 in the Haus der Technik in Essen (DE) wherein each member of the audience was given a copy of the lecture manuscript, including the illustrative part. The lecture was given as part of an entire day lecture meeting which included a total of nine new lectures on the general subject of "Measurements using test vehicles."

In addition to the multi-component measuring disc wheel, the above-cited lecture also deals with older measuring devices for the same purpose. Specially designed stub axles or wheel supports have previously, in fact, been installed for measuring purposes. Apart from the complicated conversion measures preceding a measurement and the fact that the measurement capability is limited to a single vehicle, the measurement stub axles have the disadvantage that they cannot measure braking forces so that a separate measuring device must be provided for these forces. Another, older type of measuring device is represented by the multi-component measuring hubs known in several different forms (see, for example, German Patent Document 21 04 003). These measuring hubs do not rotate with the vehicle wheel and—like the measuring stub axles—require special parts within the axle construction of the measuring vehicle. Complicated conversion of the vehicle was also, therefore, necessary prior to measurement when using multi-component measuring hubs.

So-called multi-component measuring disc wheels, integrated in a vehicle wheel, with rotating measuring devices for this purpose leave the whole of the axle construction of the vehicle unaffected and can therefore be used on different vehicles without substantial conversion measures. Because of this fundamental advantage, multi-component measuring disc wheels have been proposed by various parties. The measurement sensitive part of the multi-component measuring disc wheel shown in German Patent Document 23 02 540 has two rings at an axial distance from one another, each with four radially extending and peripherally evenly spaced measuring webs through which the force flow passes from the tire to the wheel hub and which have strain gauges applied to them. German Patent Document 28 28 538 shows a similar multi-component measuring disc wheel in which eight measuring webs are provided for each measuring web ring. The way in which the individual force components of interest are isolated by measurement techniques is not apparent from these publications. In addition, these multi-component measuring disc wheels are very voluminous and heavy and, for this reason, are not suitable for exacting measurements because, due to the additional masses, the forces to be measured are changed in a manner which is not negligible compared to a similar vehicle without a multi-component measuring disc wheel.

The measurement-sensitive part of the multi-component measuring disc wheel known from German Patent Document 32 13 319 provides, for certain fundamental measurement technology considerations, four radially weak locations on the periphery of the measurement-sensitive part. Because the multi-component measuring disc wheel is held by means of this part and the whole of the force flow is guided through this part, the stiffness of the known multi-component measuring disc wheel is impaired relative to a normal vehicle wheel and this falsifies the force relationships relative to travel with a normal wheel and, therefore, the representative nature of the measurement relative to such a driving operation.

European Laid-Open Application 352 788 shows a further multi-component measuring disc wheel which is very complicated in design; it is also very heavy, simply because of the many bolted connections, so that additional masses which falsify the measurement are to be expected. The mutual separation by measurement techniques of the measurement signals for the individual components is produced in this case by providing several different force flow paths which are made weak by an appropriate arrangement of links or flexible features relative to the respective loads which are not intended for them. Apart from the weight- the known multi-component measuring disc wheel does not therefore agree with a conventional vehicle wheel with respect to stiffness too.

The multi-component measuring disc wheel based on the generic type in accordance with the literature reference quoted at the beginning is very simple in construction and can also be made correspondingly stiff and light so that, at least if appropriate use is made of lightweight measures—use of high-strength lightweight structural materials and the application of mass-reducing recesses at the less loaded locations—a mass and stiffness corresponding to the normal wheel with respect to translational and rotational accelerations and loads can be achieved. Although the literature reference mentions that a good measurement signal resolution is possible with the multi-component measuring disc wheel, with little cross-coupling between the individual components, it does not deal with the question of how this is achieved. In connection with the calculation of the forces actually acting from the initially recorded measurement signals, however, the reference indicates that a system of four equations with four unknowns has to be solved continually in real-time in order to be able to determine the forces actually acting and of interest. In addition, complicated calibrations have to be undertaken and these must be taken into account in the calculation. From this, it may be concluded that the multi-component measuring disc wheel based on the generic type is complicated and expensive with respect to the measurement signal evaluation, which is a hindrance to the easy use of the known multi-component measuring disc wheels.

German Patent Specification 27 08 484 or German Patent Document 28 56 453 show torque measuring discs which can be integrated in the wheel for the isolated measurement of driving torques. In these discs, therefore, other forces or moments acting on the vehicle wheel have to be suppressed. In contrast, however, an attempt is made in the case of the multi-component measuring disc wheels to record several components simultaneously and isolated from one another.

The object of the invention is to improve the multi-component measuring disc wheel—based on the generic type, which is advantageous in many respects, and while retaining its advantages—in such a way that the primarily obtained measurement signals can be converted into the forces actually of interest with relatively small computational effort.

This object is achieved according to the invention by a multi-component measuring disc wheel for vehicles having a rim ring carrying the vehicle tire and an angle-section ring fastened in it instead of a conventional wheel disc. The angle-section ring has an auxiliary flange which is at right angles to the axis and is located axially approximately at the position of the rim flange of the rim ring facing away from the vehicle and whose inner edge has a larger diameter than an envelope circle around the wheel fastening bolts. The disc wheel further has an annular measuring disc held, by means of a plurality of stud bolts parallel to the axis and circular in cross-section, at a distance from the auxiliary flange on the side of the multi-component measuring disc wheel facing away from the vehicle. The inner edge of the measuring disc has a smaller diameter than the inner edge of the auxiliary flange but again having a larger diameter than the envelope circle around the wheel fastening bolts.

Stud bolts, which are designed to be identical to one another apart from very small tolerances, act as axial measuring cross-sections and are equipped with strain gauges. They are evenly distributed on a common pitch circle and are fastened in a torsionally stiff manner both in the measuring disc and in the auxiliary flange and are additionally positively secured against rotation.

The measuring disc has a number of radially extending, spoke-type measuring webs which can be divided by four without remainder, which measuring webs extend between an outer ring closed in the peripheral direction and a closed inner ring and are designed to be identical to one another apart from very small tolerances and again are equipped with strain gauges.

The multi-component measuring disc wheel also has a pot-shaped wheel adaptor bolted axially to the inner edge of the measuring disc, which wheel adaptor compensates for the axial distance between the measuring disc and the normal axial position of the bolt-on flange of the wheel disc of a conventional vehicle wheel and matches in the bolt-on region the bolt-on flange of a conventional vehicle wheel disc.

The measuring disc wheel, has, furthermore, a rotating to stationary signal transmission device at least partially within the pot-shaped wheel adaptor or arranged on it and rotatably mounted in or on the wheel adaptor and a rotational position sensor for the multi-component measuring disc wheel. The stationary par of the signal transmission device and of the rotational position sensor is fixed in a defined position on the vehicle body in the rotational direction of the multi-component measuring disc wheel by means of a linkage compensating for the suspension and/or steering motions of the multi-component measuring disc wheel.

The strain gauges applied to the axial stud bolts and the radial measuring webs are applied in such a position in each case and with respect to their alignment and are connected into associated electrical measuring bridge circuits in such a way that isolated electrical signals can be obtained with respect to the following components, i.e.

1) the vertically directed wheel load extending radially through the wheel center;

2) the horizontally directed longitudinal force, again extending radially through the wheel center;

3) the eccentric side force acting on the wheel contact surface and directed transversely to the plane of the wheel; and 4) the eccentric braking force directed parallel to the rolling direction of the vehicle wheel, i.e. acting tangentially at the wheel contact surface.

The interaction of the following features is as follows. The radially extending measuring webs of the measuring disc are used for determining the forces acting eccentrically at the wheel contact surface of the multi-component measuring disc wheel, i.e. the braking force (BK) and the side force (SK) and, for this purpose and for mutual elimination by measurement techniques, are equipped in two different ways with strain gauges whereby, for the isolated recording of the braking force directed parallel to the plane of the wheel, the peripheral bending load on the measuring webs is determined and, in consequence, strain gauges are applied in each case to the two flat sides opposite to one another in the peripheral direction of at least some of the measuring webs at the radial position of maximum bending load. The strain gauges are aligned with their measurement sensitivity parallel to the side edges and the measuring webs selected for this purpose being evenly distributed over the periphery of the measuring disc.

For the isolated recording of the side force (SK) directed transversely to the plane of the wheel, the axial shear load on the measuring webs is determined. In consequence, shear strain gauges are applied in each case to the two flat sides opposite to one another in the peripheral direction of all the measuring webs. The shear strain gauges are arranged crosswise and extending with their measurement sensitivity at an angle of 45° to the side lines.

The axial stud bolts are used for determining a total resultant of the components directed parallel to the plane of the wheel, namely the vertical wheel load (RL), the horizontal longitudinal force (LK) and the braking force (BK). It is possible to resolve the total resultant into its vertical component corresponding to the wheel load (RL) and into its horizontal component corresponding in magnitude to the sum of the longitudinal force (LK) and the known braking force (BK) so that the wheel load (RL) and the longitudinal force (LK) can be determined.

For the elimination by measurement techniques of the effect of the side force (SK) and of the torque effect of the braking force (BK), all the stud bolts are equipped with shear strain gauges in a non-axisymmetrical manner at four peripheral regions which have the same cartesian location in each case—referred to a selected peripheral position of the multi-component measuring disc wheel which can be continually detected by means of the rotational position sensor, it being possible to determine the total resultant quoted in terms of magnitude and—referred to the selected peripheral position—radial direction by means of these shear strain gauges.

The torques acting on the multi-component measuring disc wheel due to the braking forces can be recorded reliably and in an isolated manner by means of a simple measurement of the peripheral bending of the measuring webs. The influence of the side force can be reliably eliminated by the use of the axially aligned stud bolts to measure a total component located parallel to the plane of the wheel and composed of wheel load, longitudinal force and braking force. This is done by measuring the shear load on the stud bolts in association with simultaneous measurement at all the stud bolts. Because of the non-axisymmetrical application of the shear strain gauges, the direction of the total resultant relative to the selected peripheral direction can also be determined without difficulty. The vectorial resolution of this total resultant into a vertical component corresponding to the wheel load and into a horizontal component corresponding in magnitude to the scalar sum of the braking force and the longitudinal force does not represent any computational problem or effort either, so that the signals for these two force components can be provided by only small means which can still be integrated in the signal transmission device. In further processing, it is only necessary to subtract the known braking force from the horizontal component determined in such a manner. The side force can be recorded reliably and without cross-coupling involving other forces by determining the shear load on the measuring webs in the axial direction. In this case, the simultaneous use of all the measuring webs is important to eliminate a load which is non-axisymmetrical in this respect, especially one of different origin.

Other objects, advantages and novel features of the present invention will become apparent from the following detailed description of the invention when considered in conjunction with the accompanying drawings.

DETAILED DESCRIPTION OF THE DRAWING

Figure 1:
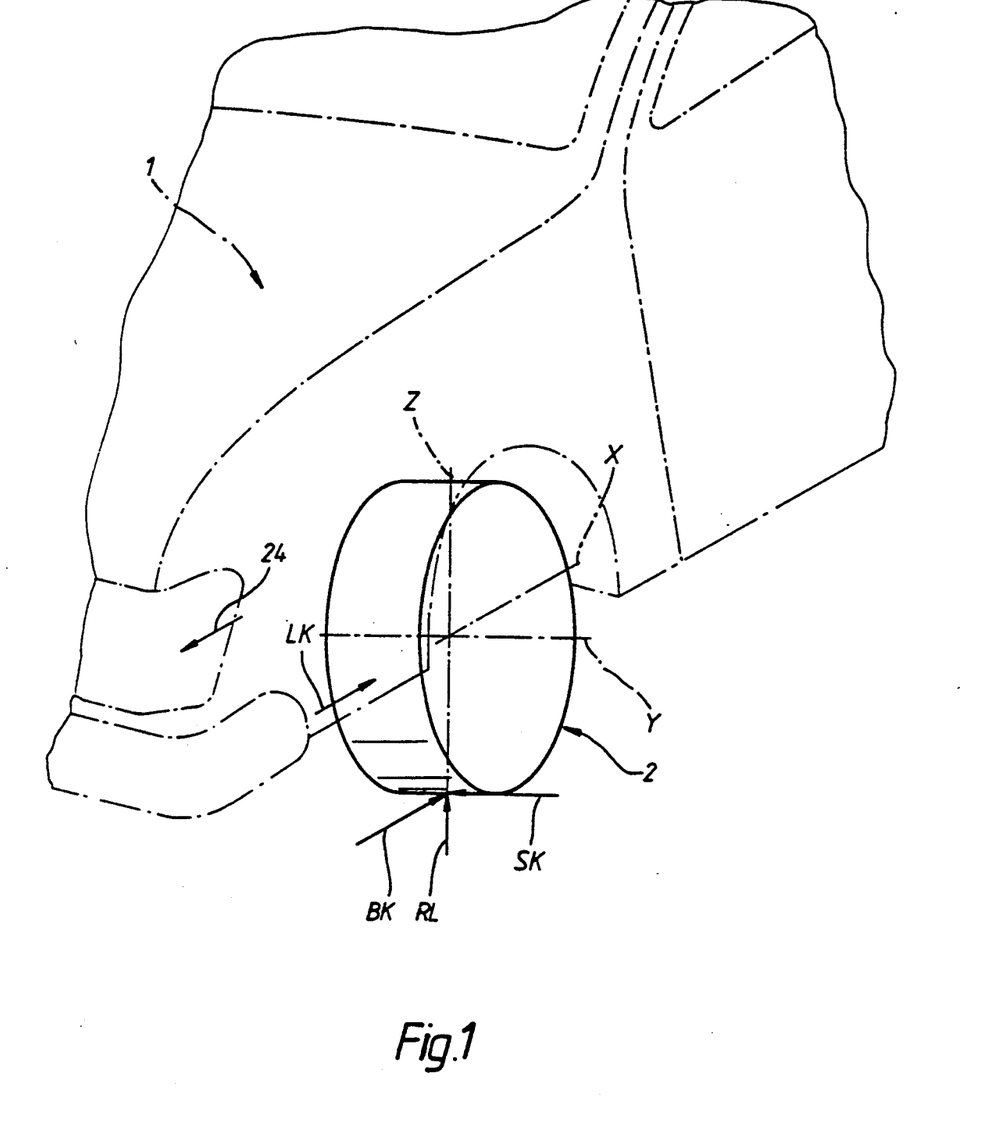
FIG. 1 shows an overall view of the forces of interest according to the present invention.

The overall representation of FIG. 1 shows a stylized multi-component measuring disc wheel 2 of the front left-hand vehicle side of a vehicle 1 as indicated by the chain-dotted lines. The forces to be recorded by the multi-component measuring disc wheel are shown in the Figure. In detail, the wheel load RL extending vertically through the wheel center and the longitudinal force LK also extending through the wheel center but located horizontally have to be determined. Also of interest are the braking force BK acting eccentrically to the wheel center at the wheel contact point and the side force SK directed transversely to the plane of the wheel. The longitudinal force and the braking force are taken as being positive in the case of a direction directed against the direction of motion 24. The wheel load is taken as being positive in the case of an upwards direction and the side force is evaluated as being positive when it acts towards the center of the vehicle. A cartesian coordinate system aligned concentrically with the axis of the wheel and parallel to the plane of the wheel is also indicated in the overall representation.

Figure 2:
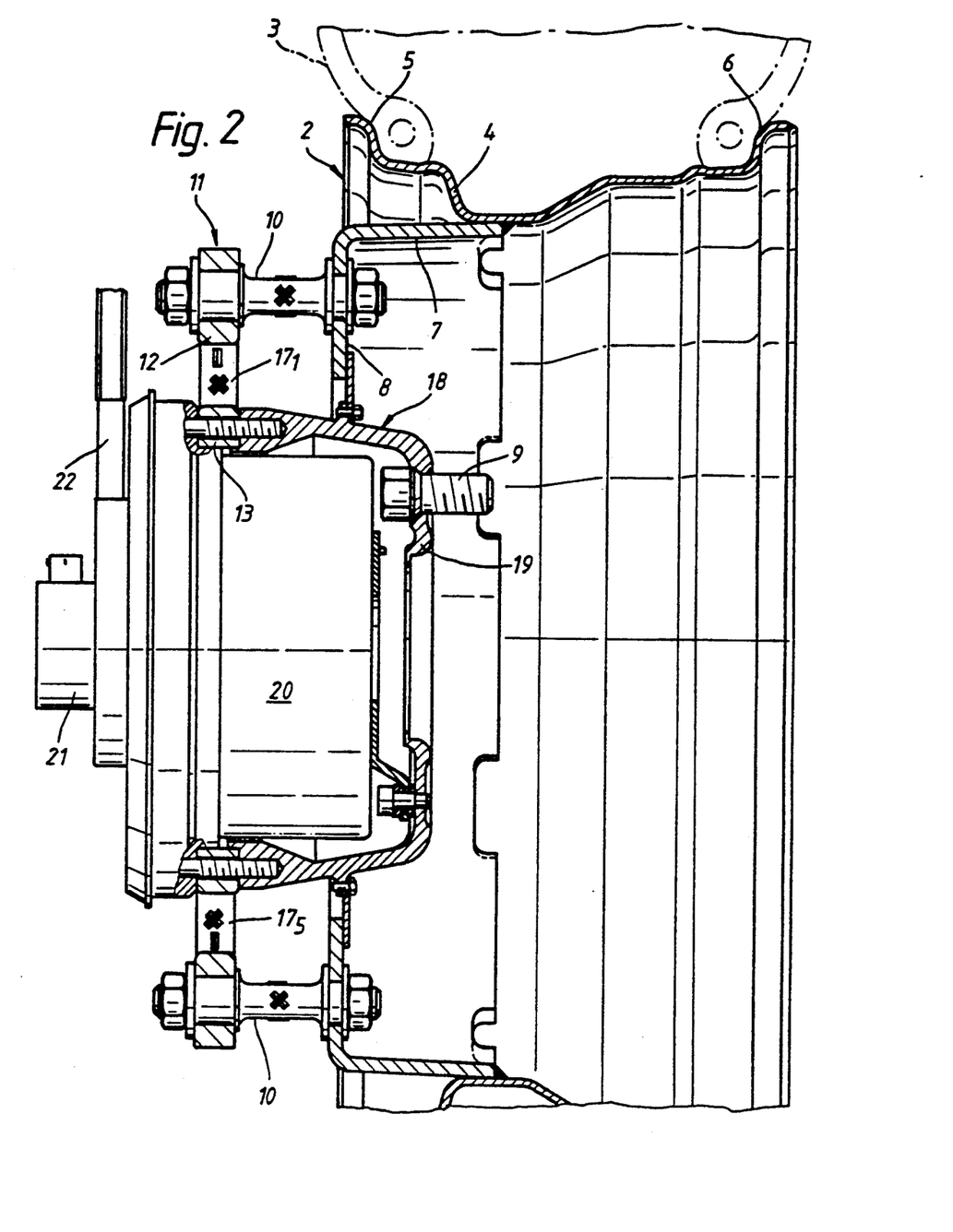
FIG. 2 is a section view through a multi-component measuring disc wheel.
Figures 3, 4:
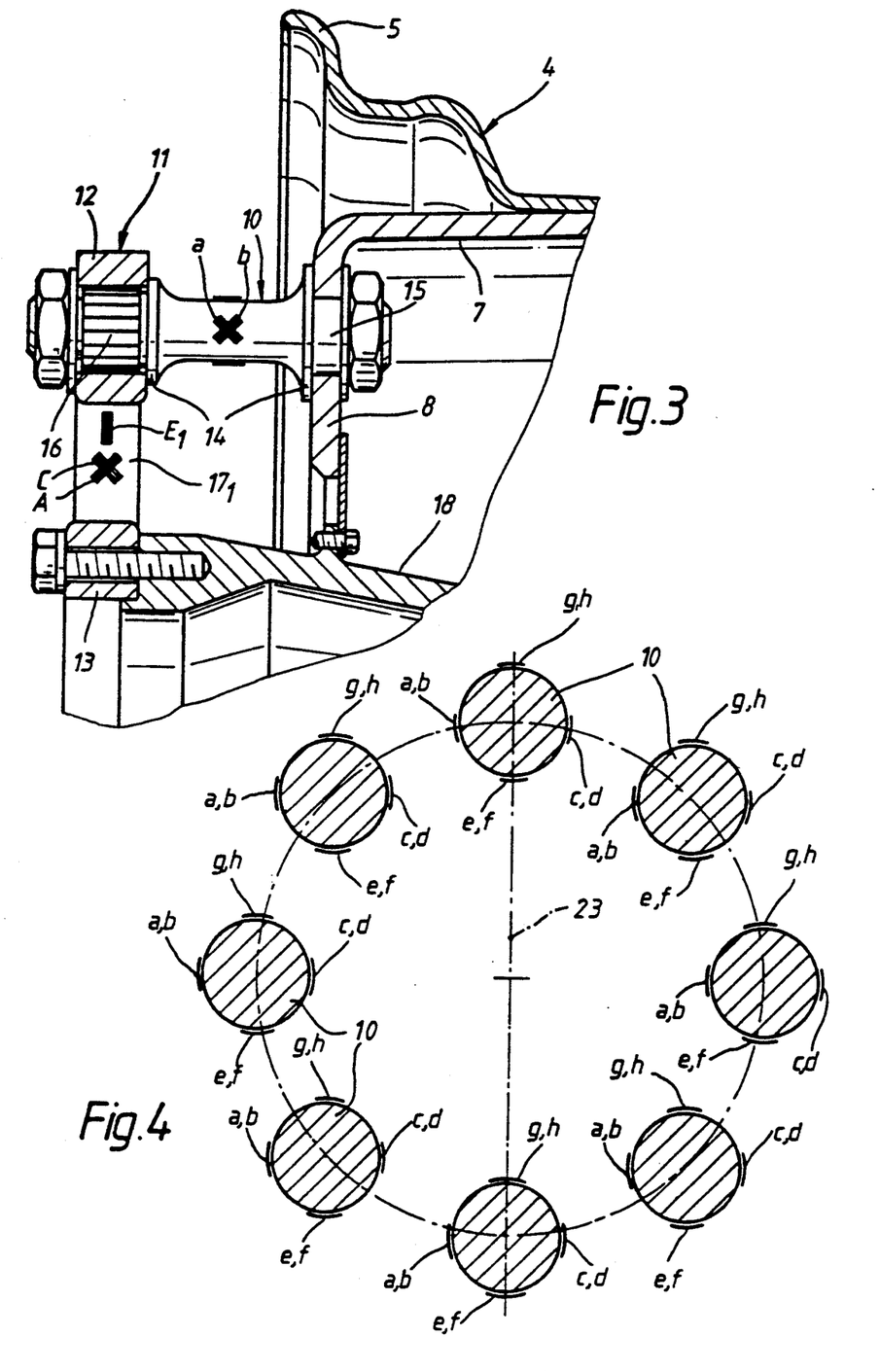
FIG. 3 is an excerpt on a larger scale of the multi-component measuring disc wheel of FIG. 2.
FIG. 4 is a diagrammatic representation of the non-axisymmetrical application of strain gauges to the axial stud bolts.

The multi-component measuring disc wheel 2 is shown in detail in FIGS. 2 and 3. It has a rim ring 4 which carries the vehicle tire 3 and has a cross-section corresponding to a conventional vehicle wheel. The multi-component measuring disc wheel, however, does not have a conventional wheel disc. Instead, an angle-section ring 7 with an auxiliary flange 8 is fastened in its place and this auxiliary flange 8 is located axially approximately at the position of the rim flange 5 facing away from the vehicle, i.e. opposite to the inner rim flange 6. The fastening of the angle-section ring 7 to the rim ring 4 is designed to be welded in the exemplary embodiment shown. It is also possible to provide a bolted connection with a plurality of small bolts, particularly where the materials of the angle-section ring and rim ring cannot be welded together or cannot be welded together very successfully. The inner edge of the auxiliary flange 8 is substantially larger than the diameter of an envelope circle circumscribing the wheel fastening bolts 9.

The actual sensor part of the multi-component measuring disc wheel 2 consists of a ring with a plurality of stud bolts 10 parallel to the axis and a measuring disc 11. The measuring disc 11 is, in fact, held at a distance from the auxiliary flange 8 on the side of the multi-component measuring disc wheel facing away from the vehicle by means of cross-sectionally circular stud bolts 10.

The inner edge of the annular measuring disc 11 has a smaller diameter than the inner edge of the auxiliary flange 8 but it again has a larger diameter than the envelope circle, already mentioned, around the wheel fastening bolts 9. Apart from very small tolerances, the stud bolts 10 are designed to be identical to one another with a high degree of precision and to have a good surface quality. The stud bolts 10 act as axial measuring cross-sections and are equipped with strain gauges, which are considered in more detail further below. In addition to their common design with respect to one another, the stud bolts 10 are evenly arranged on a common pitch circle and are bolted up in a torsionally stiff manner both in the measuring disc and in the auxiliary flange 8 and are additionally positively secured against rotation in the measuring disc 11. So that the stud bolts 10 can be bolted up in a torsionally stiff manner, they not only have a spigot 15 for the auxiliary flange 8 and a spigot 16 for the measuring disc 11 but also have, in each case, a corresponding large-area collar 14. The spigots 15 and 16 are closely fitted with corresponding openings in the auxiliary flange 8 and in the measuring disc 11. In addition, the spigots 15, 16 carry fine-thread stems by means of which the stud bolts can be bolted up in a torsionally stiff manner at both ends. So that the stud bolts can be held securely against rotation in a defined peripheral position even under load, the spigot 16 and the corresponding recess within the measuring disc 11 are not circular but are, for example, designed like a star with a sine contour of the cross-section.

Although the exemplary embodiment presented has eight stud bolts 10, which have the same peripheral arrangement as the measuring webs (still to be discussed) of the measuring disc 11, this even number of stud bolts, or a number divisible by four, is not significant nor is the peripheral agreement with the measuring webs mentioned. As an example, seven or nine or five stud bolts could also, without difficulty, lead to a usable result.

The measuring disc 11 is designed as a precision part with a high level of surface quality and geometrical dimensional accuracy. It consists essentially of an external ring 12, which is bolted to the stud bolts 10, and of an inner ring 13 which is axially bolted to the wheel adaptor 18, still to be discussed. A plurality of radially extending, spoke-type measuring webs 17, which are also equipped with strain gauges, extend between the outer ring 12 and the inner ring 13. For reasons to be discussed later, a number of measuring webs 17 which can be divided by four without remainder is, however, significant in this case. So that the individual measuring webs 17 can be later distinguished with respect to their position or can be called on by means of reference numbers, the individual reference numbers are further associated with different indices from 1 to 8 corresponding to the eight measuring webs.

Structurally, the multi-component measuring disc wheel 2 is completed by the already mentioned, pot-shaped wheel adaptor 18 which is bolted axially to the inner ring 13 of the measuring disc 11. On the one hand, the wheel adaptor 18 has the task of providing compensation for the axial distance between the measuring disc 11 and the normal axial position of the bolt-on flange of a conventional vehicle wheel. In addition, the wheel adaptor 18 is intended to make the very expensive multi-component measuring disc wheel 2 usable for different axle constructions so that the wheel adaptor 18 is designed individually for a vehicle depending on the design of the bolt-on region of the vehicle wheel but, in the region of the bolting connection to the inner ring 13 of the measuring disc, is designed to suit the latter. With respect to the bolt-on flange 19 of the wheel adaptor 18, therefore, it is here designed to agree with the wheel disc of a vehicle wheel conventional for the vehicle concerned.

Within the pot-shaped wheel adaptor 18, there is a signal transmission device which transmits the measurement signals coming from the rotating wheel to a fixed location moving with the vehicle. The signal transmission device 20 is therefore fixed in the peripheral direction and must, in consequence, be mounted so that it can rotate relative to the rotating wheel. So that it can also obtain measurement information about the current peripheral position of the multi-component measuring disc wheel 2, the signal transmission device 20 is also combined with a rotational position sensor 21. The fixed part of the signal transmission device 20 of the rotational position sensor 21 is fixed on the vehicle body in a defined position in the rotational direction by means of a linkage 22. The linkage is able to compensate for the suspension and/or steering motions of the multi component measuring disc wheel and is correspondingly designed to be movable.

The strain gauges applied to the axial stud bolts 10 and the radial measuring webs 17 are applied there in each case in such a manner, and are connected into the associated electrical measuring bridge circuit in such a way, that isolated electrical signals can be obtained with respect to the forces of interest, i.e. wheel load, longitudinal force, side force and braking force.

The present invention is especially concerned with an appropriate local application and electrical connection of the strain gauges so that measurement results can be reached more rapidly with a reduced computational and calibration effort.

For this purpose, the radially extending measuring webs 17 of the measuring disc 11 are used to determine the braking force BK and the side force SK and are equipped, in a manner suitable for this purpose, with two different sorts of strain gauges. The peripheral bending load on the measuring webs is determined for the isolated recording of the braking force directed parallel to the plane of the wheel and, in consequence, tension/compression strain gauges are applied in each case to the two flat sides opposite to one another in the peripheral direction of the measuring webs. The tension/compression strain gauges are aligned with their measurement sensitivity parallel to the side edges. Tests have shown that it is not necessary to use all eight measuring webs 17 to determine the braking force and that a sufficiently constant signal can also be achieved by using four measuring webs. In consequence, only the measuring webs 171, 173, 175 and 177 were equipped with corresponding tension/compression strain gauges E1, E3, Es, E7, F1, F3, Fs and F7. The selected measuring webs are, of course, evenly distributed over the periphery of the measuring disc 11. The axial shear load on the measuring webs 17 is determined for the isolated recording of the side force SK directed transversely to the plane of the wheel and, in fact, all eight measuring webs are determined. Shear strain gauges are, in consequence, applied in each case to the two flat sides opposite to one another in the peripheral direction of all the measuring webs 17. These shear strain gauges are arranged crosswise and extend with their measurement sensitivity at an angle of 45° to the side lines of the measuring webs. The application of the strain gauges and the nature of their electrical connection will be dealt with in more detail further below.

Of the forces occurring in practice, and of interest in the present case, the side force SK is the only one which is directed transversely to the plane of the wheel; the three other forces of interest are directed parallel to the plane of the wheel. These three forces parallel to the wheel can be determined as a total resultant by means of the axial stud bolts 10, the radial bending of the axial stud bolts being determined in magnitude and direction and evaluated to provide a measure of the total resultant. Because the axial stud bolts 10 are included in the deformation measurement over the complete periphery of the multi-component measuring disc wheel, the effects of the side for SK are neglected—given a rational electrical connection of the relevant strain gauges—because these effects cancel each other out. The total resultant thus determinable of the forces acting parallel to the wheel can be simply resolved into the vertical component corresponding to the wheel load RL, on the one hand, and into the horizontal component which corresponds to the—scalar—sum of the separately determinable and therefore known braking force BK and the still unknown longitudinal force LK, on the other. It is therefore only necessary to subtract the braking force from the horizontal component of the total resultant in order to obtain the longitudinal force of interest.

In order to determine the total resultant parallel to the wheel, all the stud bolts 10 are equipped with shear strain gauges of the types a, b, c, d, e, f, g and h in a non-axisymmetrical manner in each case at four peripheral regions which have the same cartesian location, i.e. each of the stud bolts is equipped with a total of eight different types of strain gauges. The peripheral regions of the stud bolts with the same cartesian location are referred to a selected peripheral position 23 of the multi-component measuring disc wheel, as is made clear in FIG. 4. The application of the shear strain gauges of the types a, b, c, d, e ~ f, g and h takes place ~ in fact, in accordance with the following prescription: referred to the selected peripheral position 23 of the multi-component measuring disc wheel 2, all the stud bolts 10 are respectively equipped both on the two vertical peripheral surface regions located opposite to one another to the right and the left and on the two horizontal peripheral surface regions, offset by 90° to them, with, in each case, two shear strain gauges arranged cross-wise and extending with their measurement sensitivity at an angle of 45° to the generator lines of the stud bolts, i.e. in total with eight shear strain gauges in each case.

Figure 5:
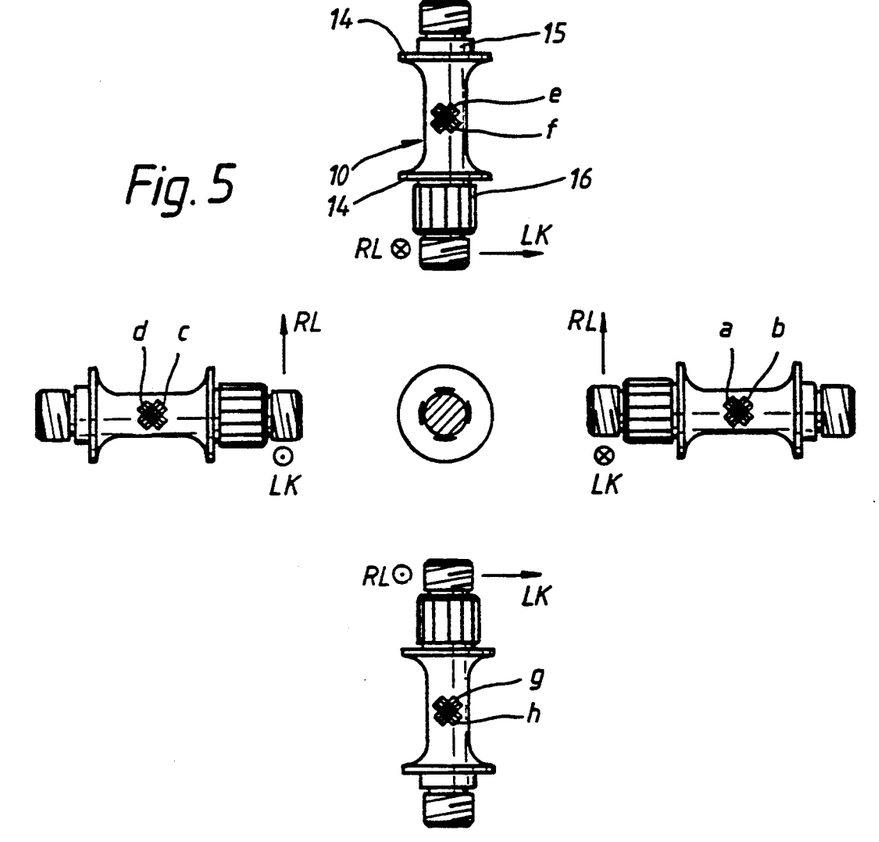
FIG. 5 is the representation of the application of the strain gauges to four peripheral positions of one of the stud bolts.

Although the individual shear strain gauges are structurally integrated in pairs to provide a measuring part which can be applied singly and the strain gauges to be applied to the four differently located peripheral regions are structurally similar, the different types referred to by the letters a, b, c, d, e, f, g and h are specified by the following prescription: when the multi-component measuring disc wheel 2 located in the selected peripheral position 23 is loaded by the wheel load RL directed vertically upwards, all eight stud bolts 10 are bent radially upwards and, in consequence, a vertical shear strain gauge of type b arranged on the left in the bonding plan of FIG. 5 is squeezed and the shear strain gauge a arranged crosswise to the one just mentioned is stretched. Due to the same load, a likewise vertical shear strain gauge d arranged on the right-hand side is also squeezed and the shear strain gauge c located crosswise to it is stretched. The two horizontal shear strain gauges g and h arranged at the top are squeezed by the wheel load and the two lower shear strain gauges of type e and f are stretched by the wheel load. For more precise characterization of the individual shear strain gauges, it is also necessary to consider in more detail the load on the stud bolts 10 of the multi-component measuring disc wheel 2 due to the longitudinal force LK directed horizontally towards the rear on the wheel. Due to this load, a horizontal shear strain gauge h arranged at the top of the stud bolt is squeezed and the upper shear strain gauge g arranged crosswise to it is stretched. In a similar manner, a horizontal shear strain gauge e arranged at the bottom is also squeezed by the longitudinal force and the shear strain gauge f located crosswise to it is stretched. The two vertical shear strain gauges c and d arranged on one side are squeezed by the longitudinal force and the two opposite shear strain gauges a and b are stretched.

The type of loading on the individual shear strain gauges of the stud bolts 10 due to the wheel load and due to the longitudinal force having been individually characterized in more detail, it is now possible to consider their electrical connection more closely. In fact, all the shear strain gauges, a total of 64, of the types a, b, c, d, f, g and h are connected into the four measuring bridge arms I, II, III and IV of FIG. 6. In this, all the tension-loaded shear strain gauges of type a applied to the stud bolt 10 on the left-hand side in the selected peripheral position 23 are connected in series in the first measuring bridge arm I. The shear strain gauges of type b also applied to the stud bolt 10 on the left-hand side in the selected peripheral position 23, but which are compression-loaded, are connected in series in a second measuring bridge arm II. All the tension-loaded shear strain gauges of type c applied to the stud bolt 10 on the right-hand side are connected in series in the third measuring bridge arm III and all the compression-loaded shear strain gauges of type d applied to the stud bolt 10 on the right-hand side are connected in series in the fourth measuring bridge arm IV. It should be noted that the tension-loaded shear strain gauges of type a and type c of the left-hand and the right-hand side, respectively, are arranged diametrically opposite to one another in the measuring bridge circuit. It should also be noted that the compression-loaded shear strain gauges of type b and type d of the left-hand and the right-hand side, respectively, are again arranged diametrically opposite to one another in the measuring bridge circuit and, in each case, between the measuring bridge arms of the tension-loaded strain gauges.

Figure 6:
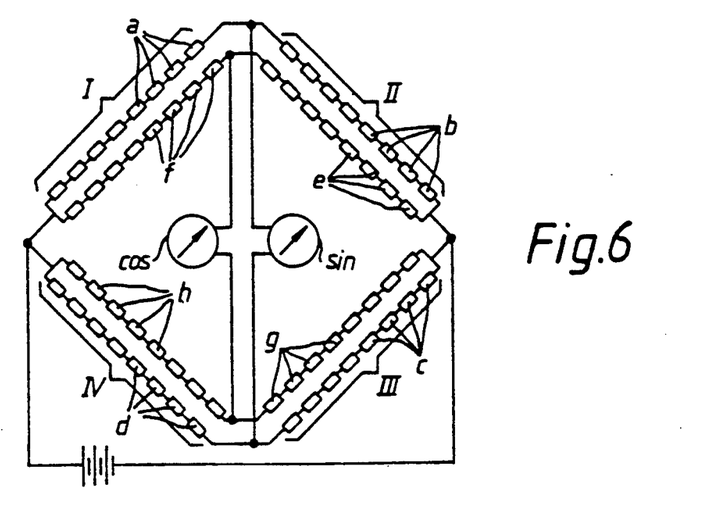
FIG. 6 is a schematic diagram illustrating the electrical connection of the strain gauges applied to the stud bolts in a measuring bridge circuit for determining the total resultant of the braking force, the longitudinal force and the wheel load.

Up to now, nothing has been said about the electrical connection of the horizontal shear strain gauges of the types e, f, g and h in the selected peripheral position 23 loaded by the longitudinal force LK. These horizontal shear strain gauges are also electrically connected very similarly to the vertical shear strain gauges. All the tension-loaded shear strain gauges of the type f applied to the bottom of the stud bolt 10 are, in fact, connected in series with one another and are connected in total in parallel with the first measuring bridge arm I, this parallel connection being understood in a particular manner explained in more detail further below. In principle, it concerns a special measuring bridge circuit with the strain gauges e to h in which, however, the measuring bridge arms formed by these strain gauges must be located in a defined position relative to one another and compared with the measuring bridge arms formed by the strain gauges a to d. This is here given the preliminary and short designation of "connected in parallel", even if this is not quite correct. The other shear strain gauges of type e applied to the bottom of the stud bolts but compression-loaded are similarly connected in series and are connected in total in parallel (in the manner mentioned above) with the second measuring bridge arm II. In addition, all the tension-loaded shear strain gauges of type g applied to the top of the stud bolts 10 are again connected in series with one another and are connected in total in parallel with the third measuring bridge arm III. Finally, the remaining compression-loaded shear strain gauges of type h applied to the top of the stud bolts are also connected in series with one another and are connected in total in parallel with the fourth measuring bridge arm IV. It is, however, necessary to note certain peripheral positions of the shear strain gauges within the measuring wheel, on the one hand, and within the measuring bridge circuit, on the other. On the one hand, the upper and lower tension-loaded shear strain gauges of the types f and g just be arranged diametrically opposite to one another in the first and third measuring bridge arms I and III, respectively; on the other hand, the upper and lower compression-loaded shear strain gauges of the types e and h must also be arranged, again diametrically opposite to one another, in the second and fourth measuring bridge arms II and IV, respectively. The parallel connection of strain gauge series in the measuring bridge arms, mentioned several times above, is—as stated—not to be understood in the strict literal sense as a parallel connection but only as a partial parallel connection. In fact, the parallel connection of the strain gauge series is meant in such a way that the strain gauge series to be connected in parallel, a and f or b and e, etc, are only located in parallel with respect to the primary voltage supply of the individual measuring bridge arms but that, in contrast, the measurement signals at the other ends of the strain gauge series are each taken off separately and further processed in two different channels.

In fact, one measurement signal contains the sine component referred to the selected peripheral position 23 of the multi-component measuring disc wheel 2 whereas the other measurement signal represents its cosine component. In association with the rotational position sensor 21 of the multi-component measuring disc wheel, the magnitude and direction of the total resultant can be determined continuously from these two components and from these two parameters, the horizontal component and the vertical component can, in turn, be determined continuously and without any great effort in terms of apparatus and computation.

For the separate determination of the braking force, tension/compression strain gauges are applied to four of the radially extending measuring webs 17, these being the measuring webs 171, 173, 175 and 177 evenly distributed over the periphery of the measuring disc 5 11. These strain gauges are applied both on the flat side leading in the peripheral direction, shown in FIG. 7b, and on the flat side trailing in the peripheral direction, shown in FIG. 7a and are aligned with their measurement sensitivity parallel to the side lines of the measuring webs. In fact, these strain gauges are applied at the radial position having the maximum bending load, which is not in the middle of the web.

Figure 9:
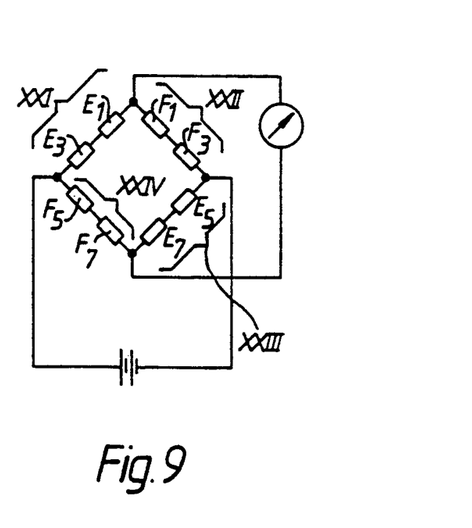
FIG. 9 is a schematic diagram illustrating the electrical connection of the tension/compression strain gauges applied to the measuring webs in a measuring bridge circuit for determining the braking force.

In the arrangement of the strain gauges $E_i$ and $F_i$ shown in the figures, these strain gauges are applied radially outside the middle of the web so that the strain gauges $F_i$ applied to the leading flat side are stretched and the strain gauges $E_i$ applied to the trailing flat side are squeezed. Although the measuring webs 17 are subjected not only to the braking force but also to bending due to the radial force and due to the longitudinal force, the effects of the longitudinal force and of the radial force can be eliminated by appropriate electrical connection of the strain gauges $E_i$ and $F_i$. In fact, in the electrical connection of the strain gauges $E_i$ and $F_i$ applied parallel to the sides, the number of strain gauges $E_i$ tension-loaded under the action of the braking force BK is evenly distributed between two diametrically opposite measuring bridge arms XXI, XXIII (FIG. 9), referred to in what follows as tension measuring bridge arms. In addition, the number of strain gauges $F_i$ compression-loaded on the appearance of a braking force is evenly distributed between the two remaining compression measuring bridge arms XXII and XXIV located between the tension measuring bridge arms. It should, however, be noted that in the distribution of the strain gauges between the two tension measuring bridge arms and between the two compression measuring bridge arms, in each case two strain gauges E1 and E3 or F1 and F3 or E5 and E7 or F5 and F7 located adjacent to one another in the measuring disc 11 are arranged in each case in the same measuring bridge arm. In the distribution of the strain gauges between the individual measuring bridge arms, it should also be noted that in each case the strain gauges E1, E3, F1 and F3 of one half of the measuring disc 11 come to be located in two adjacent measuring bridge arms XXI and XXII and that the strain gauges E5, E7, F5 and F7 of the other half of the measuring disc 11 come to be located in the two opposite and adjacent measuring bridge arms XXIII and XXIV. The force constituents of no interest can be eliminated by such an electrical connection in the measurement of the braking force and it is possible for only the latter to be displayed.

Another possible way of electrically connecting the strain gauges applied parallel to the sides in order to determine the braking force has at least some of the radially extending measuring webs, namely a number of them divisible by four—the selected measuring webs being evenly distributed over the periphery of the measuring disc—equipped both on the flat side leading in the peripheral direction and on the flat side trailing in the peripheral direction, at the radial position of the measuring webs most highly loaded in bending in the case of torque loading of the inner ring of the measuring disc relative to the outer ring, with, in each case, a strain gauge extending with its measurement sensitivity parallel to the side lines of the measuring webs, of which strain gauges, the strain gauge of each leading flat side is in each case squeezed and the other is stretched when the multi-component measuring disc wheel is loaded by a braking force. For the electrical connection of the strain gauges applied parallel to the sides, the number of strain gauges tension-loaded under the action of the braking force quoted is evenly distributed between two diametrically opposite measuring bridge arms and the number of strain gauges compression-loaded under the action of the braking force quoted is evenly distributed between the two remaining measuring bridge arms located between the tension measuring bridge arms. Further, the distribution of the tension-loaded strain gauges on one or the other of the two tension measuring bridge arms takes place in such a manner that although two strain gauges diametrically opposite to one another in the measuring disc are always arranged in the same measuring bridge arm, the tension-loaded strain gauges of each tension measuring bridge arm are, at the same time, evenly distributed on the periphery of the measuring disc. The distribution of the compression-loaded strain gauges on one or the other of the two compression measuring bridge arms takes place in a similar manner in such a way that although two strain gauges diametrically opposite to one another in the measuring disc are always arranged in the same measuring bridge arm, the compression-loaded strain gauges of each compression measuring bridge arm are, at the same time, evenly distributed on the periphery of the measuring disc.

Figures 7, 7A, 7B:
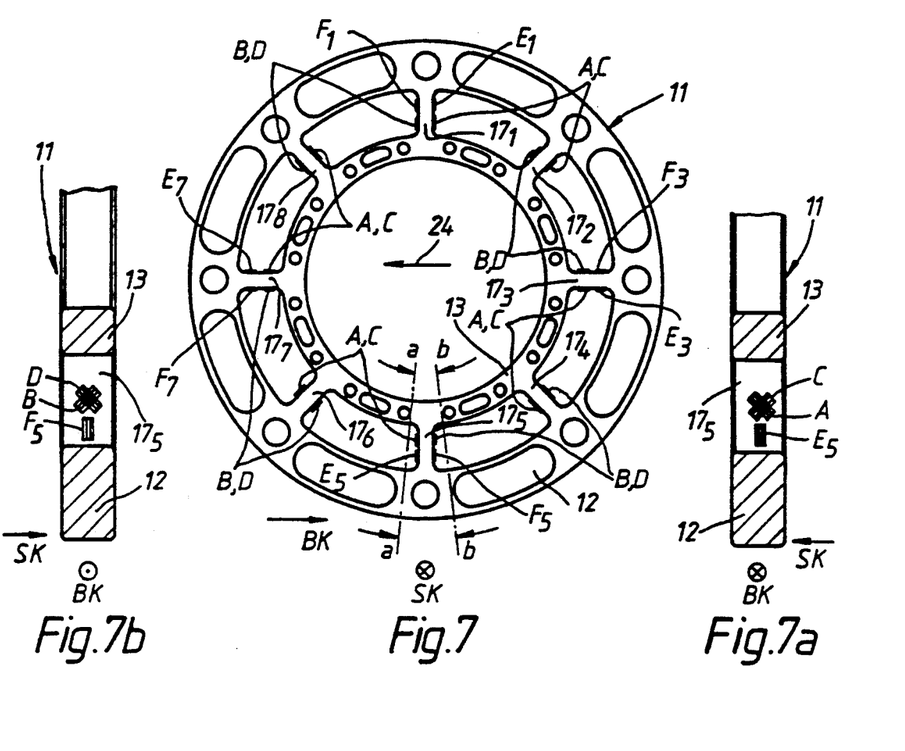
FIG. 7 is an axial view of the measuring disc of the multi-component measuring disc wheel with information on the position of the strain gauges to be applied there for the side force measurement and for the braking force measurement.
FIGS. 7a and 7b show in each case an enlarged radial section through the measuring disc of FIG. 7, along the section line a—a in the case of FIG. 7a and along the section line b—b in the case of FIG. 7b.

Shear loading of the measuring webs 17 on their 23 Daim 21 119/4 flat sides aligned parallel to the axis, these sides being shown in FIGS. 7a and 7b, occurs in pure form only due to the side force SK but the shear strain gauges A, B, C and D applied there are also deformed by forces acting parallel to the wheel such as wheel load, braking force and longitudinal force. So that these forces can be eliminated by measurement techniques in the measurement of the side force, a relatively large number of shear strain gauges must be applied and these must be again electrically connected in an appropriate manner in a measuring bridge circuit. The local application of the shear strain gauges A, B, C, D and the manner in which they are loaded by the side force is considered in more detail first.

All the measuring webs 17 are equipped with two shear strain gauges on both the flat side leading in the peripheral direction, as shown in FIG. 7b, and on the flat side trailing in the peripheral direction—FIG. 7a—in each case, i.e. in total with four shear strain gauges of type A, B, C and D in each case. When the multi-component measuring disc wheel 2 is loaded by a side force SK directed towards the center of the vehicle, one of these strain gauges on each leading flat side is squeezed, to be precise the shear strain gauge B, and the respective other strain gauge on the same flat side is stretched, namely the shear strain gauge D. In a similar manner, the respective shear strain gauge of type A of each trailing flat side is also squeezed and the other shear strain gauge C of the same flat side is stretched.

Figure 8:
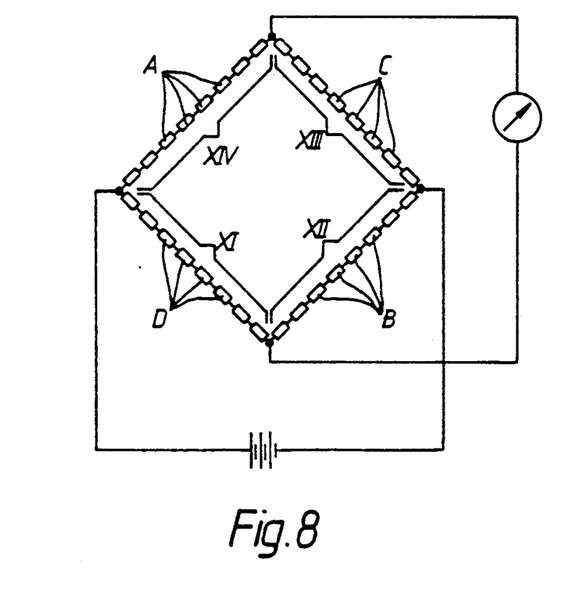
FIG. 8 is a schematic diagram illustrating the electrical connection of the shear strain gauges applied to the measuring webs in a measuring bridge circuit for determining the side force.

In the electrical connection of these four different types of shear strain gauges, in each case, one type is arranged in each different measuring bridge arm of the measuring bridge circuit shown in FIG. 8. In fact, all leading tension-loaded shear strain gauges D are connected in series in a first measuring bridge arm XI, all leading compression-loaded shear strain gauges B are connected in series in a second measuring bridge arm XII, all trailing tension-loaded shear strain gauges of type C are connected in series in a third measuring bridge arm XIII and all trailing compression-loaded shear strain gauges A are connected in series in a fourth measuring bridge arm XIV.

In the arrangement of these four different measuring bridge arms within a complete measuring bridge circuit, it should also be noted that the tension-loaded shear strain gauges of the leading flat sides at the given loading, i.e. the strain gauges D of the measuring bridge arm XI, are arranged diametrically opposite to the measuring bridge arm XIII which contains the likewise tension-loaded shear strain gauges C of the trailing flat sides. In the electrical connection, it should also be noted that the compression-loaded shear strain gauges of type B of the leading flat side and the compression-loaded shear strain gauges of type A of the trailing flat side of the second and fourth measuring bridge arms XII and XIV, respectively, are again arranged diametrically opposite to one another in the measuring bridge circuit. In this arrangement of the shear strain gauges, totalling 32, in a measuring bridge circuit, the measurement effects of the forces parallel to the wheel precisely cancel each other out so that only the effects of the side force can be recorded by the measurement-techniques.

Practical experience of the applicant with the multi-component measuring disc wheel designed according to the invention has shown that good measurements are possible with very small computational and calibrational effort. The response to this multi-component measuring disc wheel in the specialist field is very favorable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A multi-component measuring disc wheel coupled to vehicles through wheel fastening bolts comprising:
   a rim ring, having a rim flange, carrying a vehicle tire and an angle-section ring fastened in the rim ring, the angle-section ring having an auxiliary flange which is at right angles to the angle section ring axis and is located axially approximately at the position of the rim flange of the rim ring facing away from the vehicle, an inner edge of the auxiliary flange having a larger diameter than an outer circle formed around the wheel fastening bolts,
   an annular measuring disc;
   a plurality of stud bolts arranged parallel to the axis and having a circular cross-section, said stud bolts holding the annular measuring disc at a distance from the auxiliary flange on the side of the multi-component measuring disc wheel facing away from the vehicle, an inner edge of the measuring disc having a smaller diameter than the inner edge of the auxiliary flange and having a larger diameter than the outer circle formed around the wheel fastening bolts;
   wherein the plurality of stud bolts are equipped with strain gauges and are designed to be substantially identical to one another and to act as axial measuring cross-sections, the plurality of stud bolts are evenly distributed on a common pitch circle, are fastened in a torsionally stiff manner both in the measuring disc and in the auxiliary flange and are positively secured against rotation;
   wherein the measuring disc has a number of radially extending measuring webs, having opposing flat sides, which can be divided by four without any remainder, the measuring webs extend between an outer ring of the measuring disc closed in the peripheral direction and a closed inner ring of the measuring disc, are designed to be substantially identical to one another and are also equipped with strain gauges,
   a pot-shaped wheel adaptor bolted axially to the inner edge of the measuring disc, the wheel adaptor compensates for the difference between the axial distance of the measuring disc and a normal axial position of a bolt-on flange of a conventional wheel disc of a conventional vehicle wheel, the wheel adaptor matches in a bolt-on region the bolt-on flange of the conventional wheel disc,
   a rotating to stationary signal transmission device, having a rotating and a stationary part, located at least partially within or on the pot-shaped wheel adaptor and rotatably mounted in or on the wheel adaptor; and
   a rotational position sensor, having a stationary part, for the multi-component measuring disc wheel, the stationary part of the signal transmission device and of the rotational position sensor being fixed in a defined position on the vehicle in the rotational direction of the multi-component measuring disc wheel by a linkage compensating for at least one of the suspension and steering motions of the multi-component measuring disc wheel;
   wherein the strain gauges applied to the axial stud bolts and the radial measuring webs are applied in such a position in each case and with respect to their alignment and are connected into associated electrical measuring bridge circuits in such a manner that isolated electrical signals can be obtained with respect to the following components:

vertically directed wheel loads extending radially through the wheel center, horizontally directed longitudinal forces, extending radially through the wheel center, eccentric side forces acting on a wheel contact surface and directed transversely to the plane of the wheel, eccentric braking forces directed parallel to the rolling direction of the vehicle wheel, wherein the radially extending measuring webs of the measuring disc are used for determining the forces acting eccentrically at the wheel contact surface of the multi-component measuring disc wheel, such as the braking force and the side force, and are equipped in two different ways with a number of the strain gauges;

whereby, for isolated recording of the braking force directed parallel to the plane of the wheel, a peripheral bending load on the measuring webs is determined and, in consequence, the strain gauges are applied in each case to the opposing flat sides in the peripheral direction of at least some of the measuring webs at the radial position of maximum bending load, wherein the strain gauges are aligned with their measurement sensitivity parallel to the side edges and the measuring webs selected for this purpose are evenly distributed over the periphery of the measuring disc, and whereby, for isolated recording of the side force directed transversely to the plane of the wheel, an axial shear load on the measuring webs is determined and, in consequence, shear strain gauges are applied in each case to the opposing flat sides in the peripheral direction of all the measuring webs, the shear strain gauges being arranged crosswise and extending with their measurement sensitivity at an angle of 45° to the side lines, wherein the stud bolts are used for determining a total resultant of the components directed parallel to the plane of the wheel, namely the vertical wheel load, the horizontal longitudinal force and the braking force, it being possible to resolve the total resultant into its vertical component corresponding to the wheel load and into its horizontal component corresponding in magnitude to the sum of the longitudinal force and the known braking force so that the wheel load and the longitudinal force can be determined, and wherein for the elimination by measurement techniques of the effect of the side force and of the torque effect of the braking force, all the stud bolts are equipped with shear strain gauges in a nonaxisymmetrical manner at four peripheral regions which have the same cartesian location in each case in reference to a selected peripheral position of the multi-component measuring disc wheel which can be continually detected by means of the rotational position sensor, it being possible to determine the total resultant quoted in terms of magnitude and, in reference to the selected peripheral position, radial direction by these shear strain gauges.

2. A multi-component measuring disc wheel according to claim 1, wherein the shear strain gauges are applied to the stud bolts such that, in reference to a selected peripheral position of the multi-component measuring disc wheel, all the stud bolts are respectively equipped both on their two vertical peripheral surface regions located opposite one another and on their two horizontal peripheral surface regions, offset by 90° to the vertical peripheral surface regions, with, in each case, two shear strain gauges arranged cross-wise and extending with their measurement sensitivity at an angle of 45° to the generator lines wherein, during loading of the multi-component measuring disc wheel located in the selected peripheral position by the wheel load directed vertically upwards, on each stud bolt in each case:

one vertical shear strain gauge arranged on the left is squeezed and one is stretched, one vertical shear strain gauge arranged on the right is squeezed and one is stretched, the two horizontal shear strain gauges arranged at the top are squeezed and two lower strain gauges are stretched, and wherein, during loading of the multi-component measuring disc wheel located in the selected peripheral position by a longitudinal force directed horizontally towards the rear, on each stud bolt one horizontal shear strain gauge arranged at the top is squeezed and one is stretched, one horizontal shear strain gauge arranged at the bottom is squeezed and one is stretched and two vertical shear strain gauges arranged on one side are squeezed and two opposite vertical shear strain gauges are stretched, and wherein the shear strain gauges have an electrical connection such that, of the vertical shear strain gauges in the selected peripheral position loaded by the wheel load, all tension-loaded shear strain gauges of the stud bolts applied to the stud bolt applied to the stud bolt on the left-hand side are connected in series in a first measuring bridge arm, all compression-loaded shear strain gauges of the stud bolts applied to the stud bolt on the left-hand side are connected in series in a second measuring bridge arm, all tension-loaded shear strain gauges of the stud bolts applied to the stud bolt on the right-hand side are connected in series in a third measuring bridge arm, all compression-loaded shear strain gauges of the stud bolts applied to the stud bolt on the right-hand side are connected in series in a fourth measuring bridge arm, wherein the tension-loaded shear strain gauges of the first and third measuring bridge arms are arranged diametrically opposite to one another in the measuring bridge circuit, on the one hand, and the compression-loaded shear strain gauges of the second and fourth measuring bridge arms are again arranged diametrically opposite to one another in the measuring bridge circuit, on the other hand, and wherein the shear strain gauges have a further electrical connection such that, of the horizontal shear strain gauges in the selected peripheral position loaded by the longitudinal force, all tension-loaded shear strain gauges of the stud bolts applied to the bottom of the stud bolt are connected in series with one another and are connected in total in parallel with the first measuring bridge arm, all compression-loaded shear strain gauges of the stud bolts applied to the bottom of the stud bolt are connected in series with one another and are connected in total in parallel with the second measuring bridge arm, all tension-loaded shear strain gauges of the stud bolts applied to the top of the stud bolt are connected in series with one another and are connected in total in parallel with the third measuring bridge arm, all compression-loaded shear strain gauges of the stud bolts applied to the top of the stud bolt are connected in series with one another and are connected in total in parallel with the fourth measuring bridge arm, whereby, on the one hand, the upper and lower tension-loaded shear strain gauges are arranged diametrically opposite to one another in the first and third measuring bridge arms of the measuring bridge circuit and, on the other hand, the upper and lower compression-loaded shear strain gauges are arranged, again diametrically opposite to one another, in the second and fourth measuring bridge arms of the measuring bridge circuit and whereby, the parallel connection of the strain gauge series in the measuring bridge arms is such that the strain gauge series to be connected in parallel are only located in parallel with respect to a primary voltage supply of the individual measuring bridge arms and that, in contrast, the measurement signals at the other ends of the strain gauge series for the vertical shear strain gauges in the selected peripheral position, on the one hand, and for the horizontal shear strain gauges on the other hand, are in each case taken off separately and are further processed in two separate channels, one measurement signal representing the sine component of the total resultant parallel to the wheel in reference to the selected peripheral position of the multi-component measuring disc wheel, and the other measurement signal representing its cosine component.

3. A multi-component measuring disc wheel according to claim 1, wherein all of the radially extending measuring webs are equipped with two shear strain gauges on both the flat side leading in the peripheral direction and on the flat side trailing in the peripheral direction in each case, wherein when the multi-component measuring disc wheel is loaded by a side force directed towards the center of the vehicle in each case one of the shear strain gauges of each leading flat side is squeezed and the other is stretched and one of the shear strain gauges of each trailing flat side is squeezed and the other is stretched, whereby, of the shear strain gauges applied to the radially extending measuring webs leading tension-loaded shear strain gauges applied to the measuring webs are connected in series in a first measuring bridge arm, all leading compression-loaded shear strain gauges applied to the measuring webs are connected in series in a second measuring bridge arm, all trailing tension-loaded shear strain gauges applied to the measuring webs are connected in series in a third measuring bridge arm, all trailing compression-loaded shear strain gauges applied to the measuring webs are connected in series in a fourth measuring bridge arm, whereby, on the one hand, the tension-loaded shear strain gauges of the first and third measuring bridge arms are arranged diametrically opposite to one another in the measuring bridge circuit and whereby, on the other hand, the compression-loaded shear strain gauges of the second and fourth measuring bridge arms are again arranged diametrically opposite to one another in the measuring bridge circuit.

4. A multi-component measuring disc wheel according to claim 1, wherein the radially extending measuring webs, four measuring webs evenly distributed over the periphery of the measuring disc are equipped both on the flat side leading in the peripheral direction and on the flat side trailing in the peripheral direction at the radial position of the measuring webs most highly loaded in bending in the case of torque loading of the inner ring of the measuring disc relative to the outer ring with, in each case, one of the strain gauges extending with its measurement sensitivity parallel to the side lines of the measuring webs, of which strain gauges, the strain gauges of the flat sides pointing in one peripheral direction are squeezed when the multi-component measuring disc wheel is loaded by the braking force and the strain gauges of the other flat sides are stretched, whereby, for the electrical connection of the strain gauges applied parallel to the sides:

the number of strain gauges tension-loaded under the action of the braking force is evenly distributed between two diametrically opposite tension measuring bridge arms, and the number of strain gauges compression-loaded under the action of the braking force is evenly distributed between the two remaining compression measuring bridge arms, located between the tension measuring bridge arms, whereby the distribution of the tension-loaded strain gauges on one or the other of the two tension measuring bridge arms and the distribution of the compression-loaded strain gauges on one or the other of the two compression measuring bridge arms takes place, on the one hand, in such a manner that in each case two strain gauges located adjacent to one another in the measuring disc are arranged in the same measuring bridge arm, and whereby the distribution of all the tension-loaded strain gauges and all the compression-loaded strain gauges on the four measuring bridge arms takes place, on the other hand, in such a manner that in each case the strain gauges of one half of the measuring disc are located in two adjacent measuring bridge arms and the strain gauges of the other half of the measuring disc are located in the two other measuring bridge arms.

5. A multi-component measuring disc wheel according to claim 1, wherein at least some of the radially extending measuring webs, namely a number of them divisible by four, are equipped both on the flat side leading in the peripheral direction and on the flat side trailing in the peripheral direction, at the radial position of the measuring webs most highly loaded in bending in the case of torque loading of the inner ring of the measuring disc relative to the outer ring, with, in each case, a strain gauge extending with its measurement sensitivity parallel to the side lines of the measuring webs, of which strain gauges, the strain gauge of each leading flat side is in each case squeezed and the other is stretched when the multi-component measuring disc wheel is loaded by a braking force, whereby for the electrical connection of the strain gauges applied parallel to the sides:

the number of strain gauges tension-loaded under the action of the braking force is evenly distributed between two diametrically opposite tension measuring bridge arms, and the number of strain gauges compression-loaded under the action of the braking force quoted is evenly distributed between the two remaining measuring bridge arms located between the tension measuring bridge arms, whereby, the distribution of the tension-loaded strain gauges on one or the other of the two compression measuring bridge arms takes place in such a manner that although two strain gauges diametrically opposite to one another in the measuring disc are arranged in the same measuring bridge arm, the tension-loaded strain gauges of each tension measuring bridge arm are, at the same time, evenly distributed on the periphery of the measuring disc.

* * * * *